(12) United States Patent
Shue

(10) Patent No.: US 7,083,381 B2
(45) Date of Patent: Aug. 1, 2006

(54) HYDROKINETIC TORQUE CONVERTER STATOR BLADE CONSTRUCTION

(75) Inventor: John Shue, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 145 days.

(21) Appl. No.: 10/855,150

(22) Filed: May 27, 2004

(65) Prior Publication Data
US 2005/0262837 A1   Dec. 1, 2005

(51) Int. Cl.
*F16D 33/00* (2006.01)
(52) U.S. Cl. .................. 415/191; 415/188; 415/208.2; 415/208.5; 415/210.1; 415/211.2; 416/197 C; 60/361; 60/362
(58) Field of Classification Search ............... 415/188, 415/191, 208.1, 208.2, 208.3, 208.5, 210.1, 415/211.1, 211.2; 416/180, 197 C; 60/361–362
See application file for complete search history.

(56) References Cited

U.S. PATENT DOCUMENTS

| | | | |
|---|---|---|---|
| 1,777,098 A * | 9/1930 | Lysholm .................. 415/208.1 |
| 2,122,353 A | 6/1938 | Salerni |
| 2,755,628 A | 7/1956 | Mamo |
| 2,961,830 A * | 11/1960 | Dundore et al. ............... 60/361 |
| 3,192,719 A * | 7/1965 | Kronogard .................... 60/361 |
| 3,330,111 A * | 7/1967 | Denes .......................... 60/361 |
| 4,180,978 A | 1/1980 | Maddock |
| 5,313,793 A | 5/1994 | Kirkwood et al. |
| 5,522,220 A | 6/1996 | Locker |
| 5,616,000 A | 4/1997 | Yamada et al. |
| 5,640,849 A | 6/1997 | Abe et al. |
| 5,836,157 A | 11/1998 | Kosuge |
| 5,966,934 A | 10/1999 | Kosuge |
| 6,003,311 A | 12/1999 | Takada et al. |
| 6,216,454 B1 | 4/2001 | Tsuzuki |
| 2003/0110764 A1 | 6/2003 | Kim et al. |

OTHER PUBLICATIONS

V. J. Jandasek, Design of Single-Stage, Three-Element Torque Converter, L. Ray Buckendale Lecture, Jan., 1961, pp. 75-102.

* cited by examiner

*Primary Examiner*—Christopher Verdier
(74) *Attorney, Agent, or Firm*—David B. Kelley; Brooks & Kushman

(57) ABSTRACT

A stator blade for a hydrokinetic torque converter, the blade profile having geometric characteristics that improve torque flow efficiency in the converter torque flow circuit, whereby the torque converter efficiency at high speed ratios is improved without significant adverse effects on the converter torque ratio at stall and at low speed ratios.

6 Claims, 6 Drawing Sheets

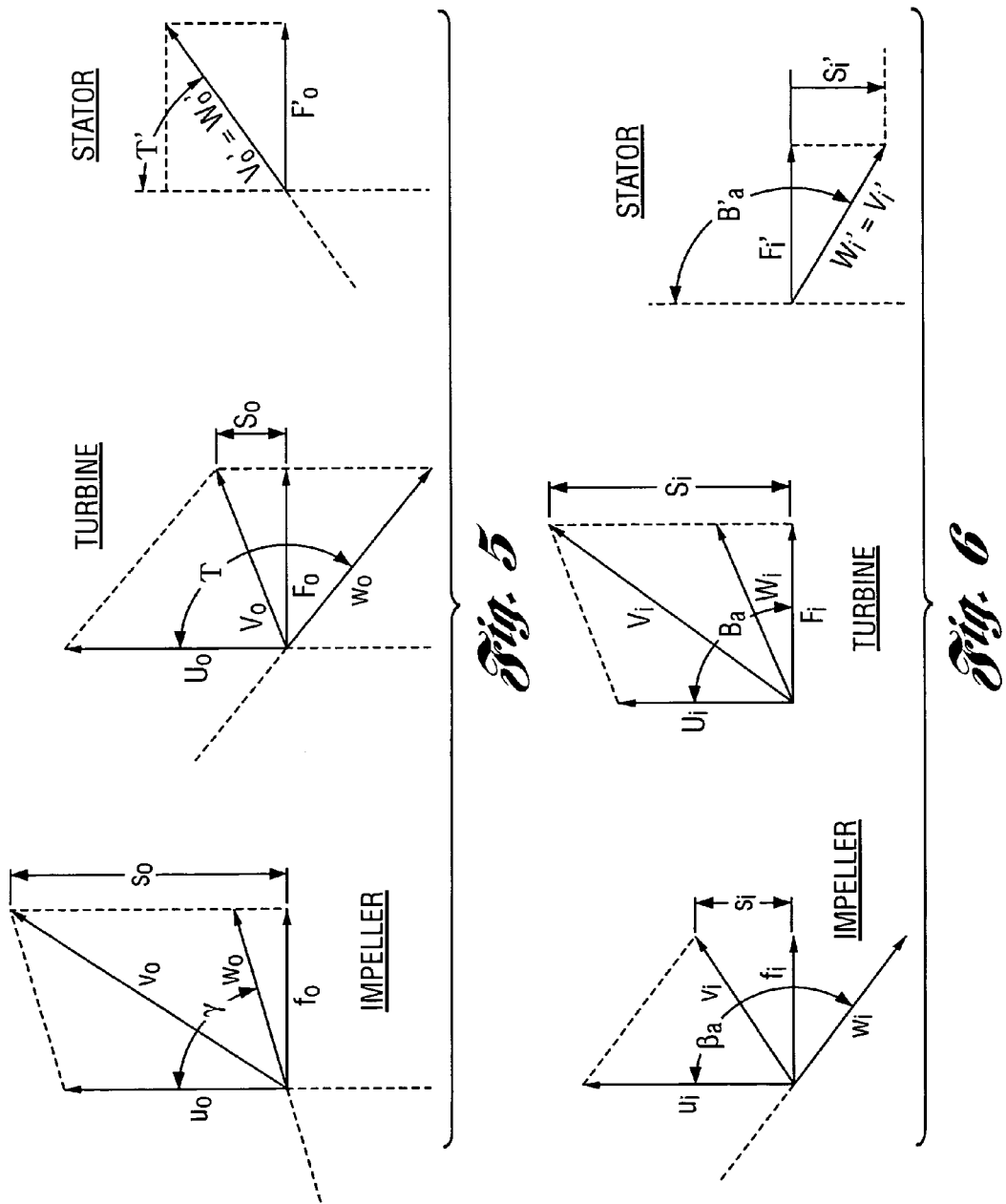

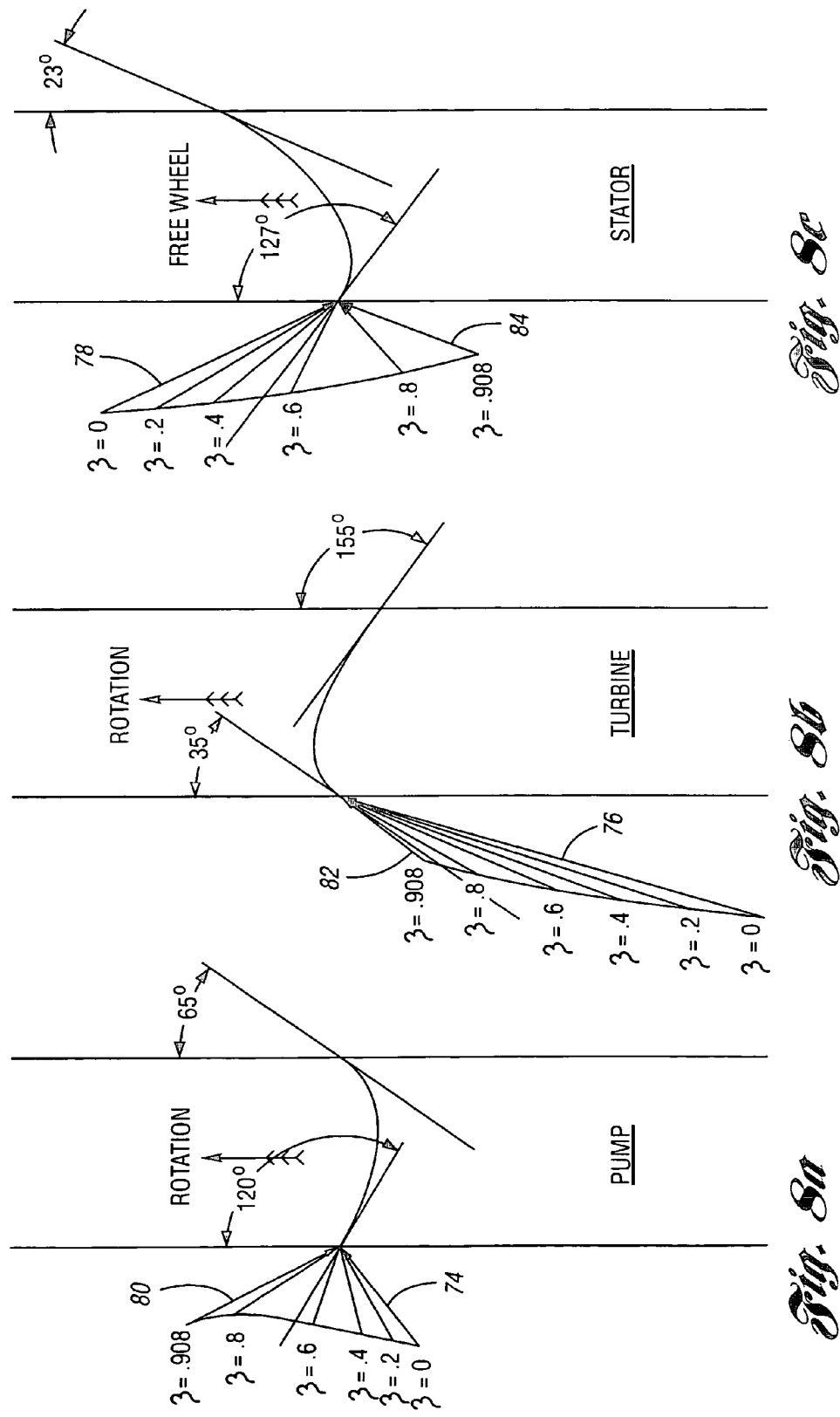

HYDROKINETIC TORQUE CONVERTER STATOR BLADE CONSTRUCTION

BACKGROUND OF THE INVENTION

1. Field of the Invention

The invention relates to a hydrokinetic torque converter with a bladed stator for use in an automotive vehicle driveline to establish a hydrokinetic torque flow path between an engine and transmission gearing.

2. Background Art

A typical hydrokinetic torque converter for use in an automotive vehicle driveline consists of three bladed elements: an impeller, a turbine and a reactor or stator. A converter of this type is described, for example, in a paper presented by V. J. Jandasek of Ford Motor Company at an L. Ray Buckendale Lecture in January, 1961.

The bladed elements of a hydrokinetic torque converter define a closed fluid flow circuit, the impeller being driven by the engine and the turbine being connected to torque input elements of a geared transmission. The reactor or stator is grounded to the transmission case by means of an overrunning clutch.

The impeller centrifugally pumps fluid to the turbine, which in turn absorbs the hydrokinetic energy of the fluid and by deflecting the fluid flow to its discharge area, the direction of flow in the torque circuit being reversed by the turbine blades. The stator provides the necessary torque reaction for the converter by re-directing the flow from the turbine in a forward direction. The impeller receives the re-directed fluid thereby creating an overall converter torque ratio.

As the turbine speed increases, a centrifugal head is created, which counteracts the centrifugal head of the impeller and reduces the absolute fluid flow velocity in the torque circuit, thereby reducing the reaction torque on the stator and reducing the torque transmitted by the over-running clutch to the case. Eventually, the torque on the reactor becomes zero as the turbine speed increases further. At this point, the converter ceases to multiply torque as it enters its fluid coupling stage. The transition from the converter stage to the fluid coupling stage is referred as the coupling point. Further increases in turbine speed will result in forward rotation of the reactor as the over-running clutch free wheels.

The impeller consists of an impeller housing, impeller blades and an inner impeller shroud. The blades typically are attached to the housing and shroud with tabs or by brazing. The impeller is connected to the engine crankshaft.

The turbine consists of a turbine inner shroud, turbine blades, and a turbine shell or outer shroud. The blades are attached to the shrouds. The turbine is drivably connected to the transmission gearing input shaft through a turbine shaft.

The stator consists of radially inward and radially outward stator shrouds, stator blades, and a stator hub. The stator blades, in a stator of the kind discussed in the paper of V. J. Jandasek, are formed with an airfoil-type profile. The stator may be manufactured using a casting method. If the casting dies are of the axial-pull type, the stator shrouds, stator blades and the hub would be formed as one integral part. If radial-pull dies are used in the manufacturing method, the radially outward stator shroud would be a separate part and would be attached to the radially outward margins of the blades by a special assembly process.

The stator is mounted on a transmission stator support shaft using an overrunning clutch or coupling as previously mentioned.

With a contemporary three-element torque converter, improved powertrain efficiency is achieved by using a mechanical converter lock up clutch, which comprises a piston plate, a clutch element and a coil spring damper installed between the turbine outer shroud and the converter impeller housing. This defines a bypass torque flow path from the engine to the transmission, which effects a direct mechanical drive for the vehicle powertrain.

In a three-element torque converter of this type, the input mechanical power from the engine is transferred through the fluid hydrodynamically due to the pumping action established by the impeller. As fluid is discharged from the impeller exit section and received by the turbine, the hydrokinetic energy of the fluid is transformed to mechanical energy. Because the angularity of the fluid flow vectors for a particle of fluid at the stator entrance section vary through a wide range of flow angles, a smooth and blunt airfoil-type profile for the leading edge of impeller blades typically is used to reduce the flow entrance losses and to improve converter performance. Such a profile, however, will reduce the effective flow area for the fluid transferred from the turbine exit section to the impeller entrance section through the stator blading. These counteractive effects must be considered in the stator blade design to achieve an optimum blade profile.

In the design of the profile for the stator blades, fundamental assumptions must be made. The performance results, following the initial design, can be varied using independent dynamometer data, but an initial theoretical analysis of the stator blade geometry using those assumptions will achieve an approximation of proposed blade data prior to dynamometer tests. Adjustments using information obtained during actual tests then can be used to modify the theoretical analysis.

One of the most fundamental assumptions that is made in a theoretical analysis of a stator blade profile is that the fluid circulating through the torus circuit of the converter follows a path that corresponds to the contour of the blades. It follows from this assumption that the fluid exit angle equals the exit angle of the blade itself. A relationship then can be established between the blade angles and the velocity vector components of a particle of fluid at a particular location in the torus circuit to obtain expressions for torque and torus flow velocity.

It is assumed also that the entire body of fluid flow particles in the torus circuit travels in the same general direction in such a manner that a tangent vector at any point on the blading is the velocity vector component of a moving body of fluid at that point. Known analytical techniques for determining blade geometry refer to this path of movement of a particle of fluid as a mean streamline. This mean streamline is that particular path over which it can be assumed that the entire mass of fluid flows. This is done to simplify the analysis.

One technique for locating the mean streamline includes computation of the root mean square distance from the axis of revolution to the inner and outer stator shrouds. This method has been proven by experience to be approximately correct. Typically, the mean streamline would tend to develop relatively close to the center of the torus. In the case of the stator, therefore, the streamline would be closer to the radially outward shroud than the radially inward shroud. Another suggested method used in earlier techniques includes designing the torus circuit cross section such that the torus area on the outer side of the streamline equals the torus area on the inner side. Obviously, such a streamline would fall closer to the radially inward stator shroud than the radially outward stator shroud. The former method may be preferred in most cases since principles of fluid mechanics will verify that streamlines in fluid flow around a corner tend to become more dense at a region closer to the center of curvature than at a region farther away due to local increases in pressure.

Another assumption, which is of relatively minor importance, is that there are no short circuiting losses as the particles of fluid traverse the torus circuit. Thus, the principle of continuity of flow can be applied without the necessity for using correction factors. Torus flow velocity then will vary at different points along the torus circuit only because of the variation in cross sectional areas along the torus circuit. The mass of fluid flowing per second at any point along the torus circuit may be expressed in terms of the flow velocity at one point, such as the flow velocity at the impeller flow exit area.

Vector diagrams of the motion of a particle fluid in the torus circuit are useful in an analysis of the stator blade geometry. These diagrams are two-dimensional representations that can simplify the mathematical procedure. This analysis is analogous to a so-called unwrapping of the circuit that makes a three-dimensional representation unnecessary. By unwrapping the circuit in an analysis of this kind, a continuous stator blade cascade is formed in a single plane.

A preliminary analysis of the kind discussed in the preceding paragraphs would not necessarily take into account all design factors that may affect the result. Some of those factors are the effect of surface roughness, the constriction of the passage due to large exit angles, the effect of viscosity, etc. A human element, therefore, should be introduced into the analysis based upon prior experience and empirical data to determine whether the flow values and the angularity of the stator blade determined analytically are reasonable.

Prior art U.S. Pat. No. 5,616,000 discloses a stator blade construction that is intended to avoid separation of the working fluid from the surface of the blade on the pressure side of the blade when the speed ratio is in a high-speed ratio range near the coupling point. The profile of the surface on the low pressure side of the blade is established by tracing out the envelope of a series of circles along the streamline, the radius of the circles following a specified function or relationship of characteristic parameters.

Prior art U.S. Pat. No. 6,003,311 discloses a stator blade with a modified fluid entrance section that is intended to improve inlet flow during high speed ratio operation. The profile of the blade surface on the high pressure side of the blade follows the contour of a streamline or a particle of fluid passing through the openings between the blades of the stator at a mid-position of the fluid flow and at the trailing blade tip. At the entrance section of the stator blade, the shape of the blade surface on the high pressure side of the blade is generally planar. This is intended to improve operating efficiency of the powertrain during idling of the engine.

SUMMARY OF THE INVENTION

The invention comprises an improved airfoil-type stator blade profile to improve fluid flow in the internal torus flow circuit of a hydrokinetic torque converter and to improve converter efficiency. A so-called camberline represents the center of the profile. The camberline is obtained for a stator blade by averaging the profile on the high pressure side of the blade and the profile on the low pressure side of the blade in a tangential direction. The camberline starts at the leading point and ends at the trailing point of the blade.

The leading point is a point along the profile at the most upstream location with respect to an X-axis coordinate. The trailing point is the point along the profile at the most downstream location with respect to the X-axis coordinate. At each point on the camberline, a curvilinear coordinate following the camberline is established. As a result, the curvilinear coordinate ranges from a value of zero at the leading point to a value of unity at the trailing point. The profile is characterized also by circumferential coordinates on the blade profile surfaces with respect to the camberline.

At least three segments are defined. A first segment is near the leading edge. A second segment is the main segment at an intermediate location along the camberline. A third segment is at the trailing point. The profile of the second segment is determined by using a linear distribution of the circumferential blade thickness in accordance with a defined profile function, the variables of the function being the curvilinear coordinate at points on the camberline, the circumferential thickness at the various points along the camberline, and the angularity of the curvilinear coordinate with respect to a thickness coordinate at various points along the camberline.

Within the segment near the trailing point, the blade thickness diminishes quickly toward the trailing point. The profile of the first or leading segment is determined by using a semi-elliptic distribution of the circumferential blade thickness with respect to the curvilinear coordinate.

The camberline is determined by the entrance and exit blade angles and by a linear distribution between the entrance and exit points. The blade entrance angle is adjusted by matching the entrance flow angle to approximately a 0.8 speed ratio condition. The blade exit angle is determined by using a calibrated K factor, which is a measure of the torque capacity for a particular powertrain.

BRIEF DESCRIPTION OF THE DRAWINGS

FIG. 5 is a representation of absolute flow velocity vectors at the impeller blade exit section, at the turbine blade exit section, and at the stator blade exit section;

FIG. 6 is a representation of flow velocity vectors corresponding to the vectors of FIG. 5, but which are computed at the entrance sections of the impeller, the turbine and the stator;

FIGS. 8a, 8b, and 8c are graphical representations of entrance velocity vectors for the impeller, the turbine, and the stator as the speed ratio of the converter changes from zero at stall to the converter coupling point.

DETAILED DESCRIPTION OF THE PREFERRED EMBODIMENT(S)

Figure 1:
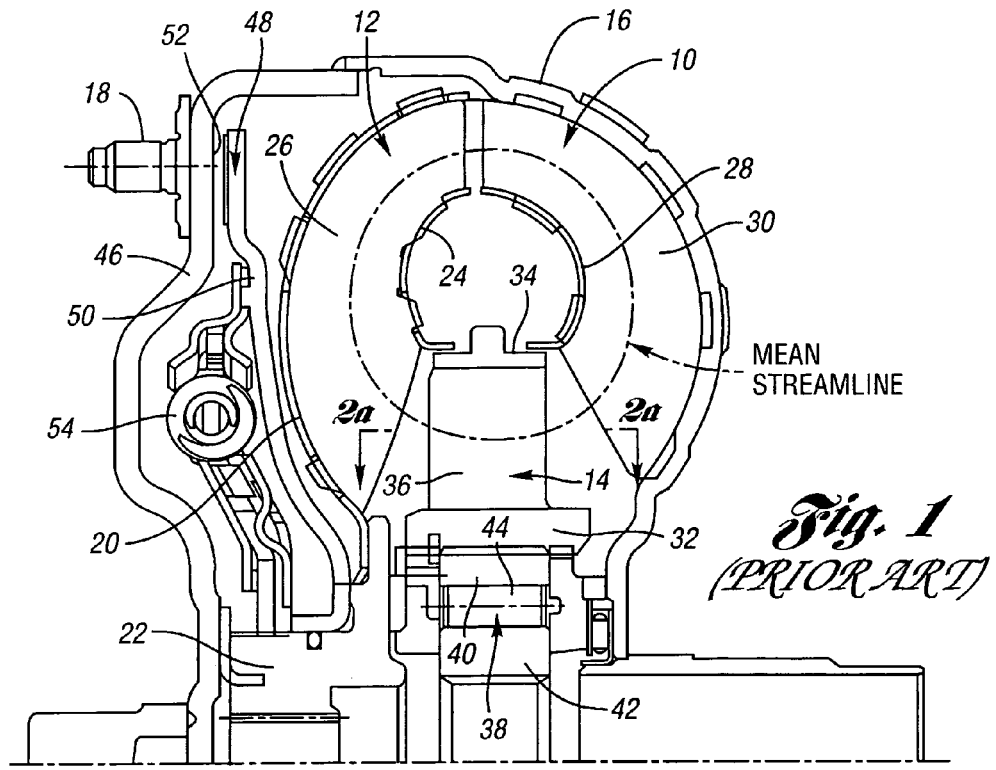
FIG. 1 is a partial cross-sectional view of a three element hydrokinetic torque converter of known design for use in an automatic transmission in an automotive vehicle powertrain.

FIG. 1 shows in cross-section a portion of a hydrokinetic torque converter that includes an impeller 10, a bladed turbine 12 and a bladed stator 14. The impeller includes an impeller shell or housing 16, which is driveably connected to a drive plate, not shown, which in turn is connected to the crankshaft of an internal combustion engine. A connection between the impeller housing 16 and the drive plate includes a drive lug or bolt, shown in part at 18.

An outer turbine shroud 20 is welded or otherwise secured to turbine hub 22, which is splined to a turbine shaft, not shown. An inner turbine shroud 24 defines with the outer turbine shroud 12 a torus flow circuit in which is situated turbine blades 26.

An inner impeller or pump shroud 28 defines with the impeller shell or housing 16 a torus flow path through the impeller. Impeller blades 30 are disposed in the torus flow circuit in the impeller between the shell 16 and the inner shroud 28.

Stator 14 comprises a radially inward shroud 32, a radially outward shroud 34 and stator blades 36. The stator blades and the shroud 32 may be formed as a unitary casting using radial-draw dies. The shroud 34 then can be assembled to the casting to form a final stator assembly. In the alternative, the blades, the shroud 32 and the shroud 34 may be cast as an integral casting if axial draw dies are used. The choice of one casting technique or the other depends in part upon the geometry of the blading, which will be described.

The shroud 32 is supported on overrunning coupling 38, which comprises a cammed outer race 40, an inner race 42 and overrunning coupling elements, such as rollers 44, between the races. The inner race 42 can be splined to a stationary stator shaft not shown.

The impeller housing or case 16 defines a clutch space between the housing wall or cover 46 and outer shroud 20 of the turbine. A lockup clutch assembly 48 is situated in the space between the turbine shroud 20 and the wall 46. As shown, the lockup clutch assembly comprises a friction clutch plate 50 having a friction surface on its outer periphery, which is engageable with a radial friction surface 52 on the interior of the impeller housing 16. The plate 50 is supported on turbine hub 22 and is driveably connected to the turbine hub by a mechanical spring damper assembly 54.

Pressure in the torus circuit of the torque converter acts on the plate 50 to deflect the disc into frictional engagement with the impeller housing when the converter control system establishes a pressure differential across the disc 50. This will effect a mechanical torque flow path from the engine to the turbine shaft, which bypasses the hydrokinetic torque flow path of the torque converter.

Figure 2A:
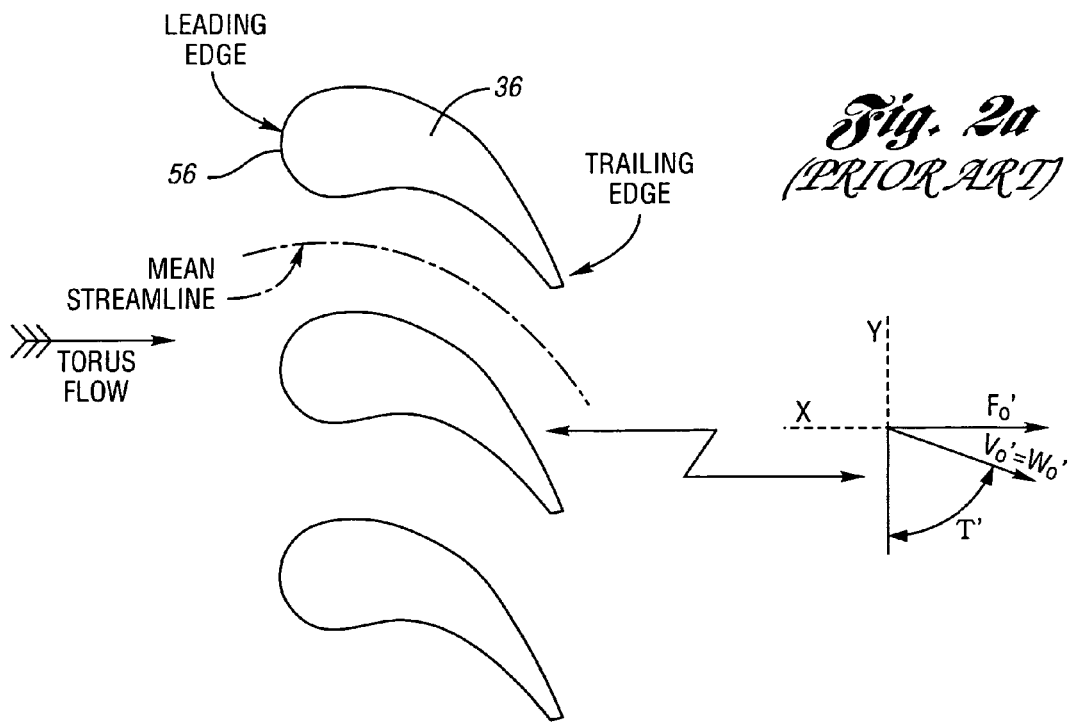
FIG. 2a is a schematic representation of a stator blade profile represented in two-dimensional cascade form as seen from the plane of section line 2a—2a of FIG. 1.

The blades 36 of the stator 14 are shown in two-dimensional cascade form in FIG. 2a. FIG. 2a is a sectional view that is unwrapped in a single plane, as seen from the plane of section line 2a—2a of FIG. 1. As will be explained subsequently, a particle of fluid in the torus flow circuit will approach the leading edge 56 of the blades 36 at various stator blade entrance angles, depending upon the speed ratio of the torque converter.

In order to provide an acceptable flow condition for the fluid flow at the entrance section of the stator blades, the leading edge of the blades is rounded to form a dynamically correct blunt leading profile. The design of the blading of FIG. 1 represents a compromise between the beneficial effects of having reduced turbulence at the leading edge and the effect of a reduction in the flow area for the fluid flow path as fluid traverses the stator blading. A blunt profile decreases the effective flow area through the stator blading. The flow area can be increased by reducing the radius curvature of the leading edge of the stator blades, but that would tend to decrease the flow efficiency of the hydrokinetic fluid through the stator blading.

FIG. 2a shows graphically the fluid flow velocity vectors of a particle of fluid passing through the spaces between the stator blading. The flow vectors are represented in an XY plane. The torus flow vector is represented by the symbol $F_O{}'$. The angle of the stator blading at the trailing edge of the blading is represented as T'. The velocity vector along the mean streamline for a particle of fluid passing through the stator blading at the trailing edge is represented by the symbol $V_O{}'$. This is also the absolute flow velocity vector $W_O{}'$.

Figure 2B:
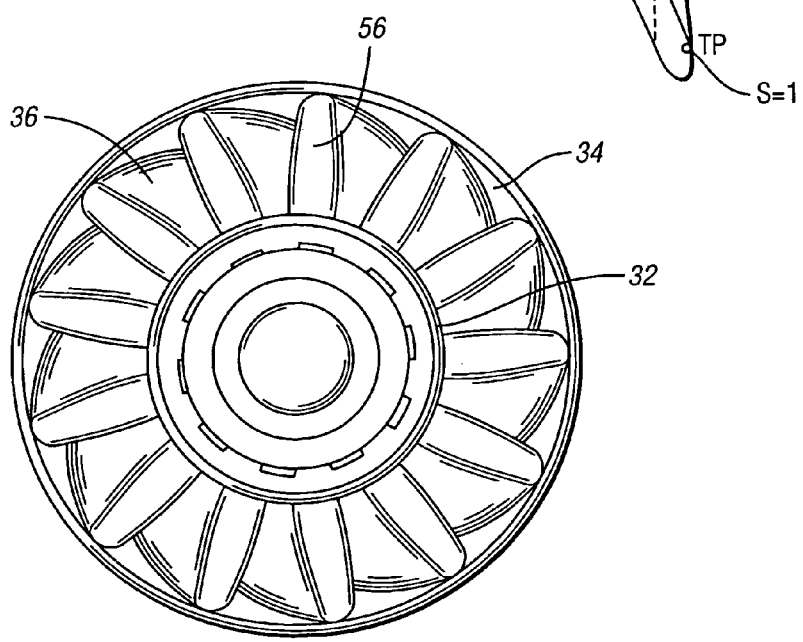
FIG. 2b is a view of the stator blading of FIG. 1 as seen from a vantage point on the axis of the stator at the stator flow entrance section.

FIG. 2b shows an end view of the entrance section of the stator blading 36 for the stator 14. The curvature of the stator blade is such that a particle of fluid for the torus flow passing through the stator blading is forced to change direction so that it has a substantial component in the direction of motion of the impeller, which creates incremental torque on the impeller. The reaction for the incremental torque is accommodated by the overrunning coupling 38.

Figure 3:
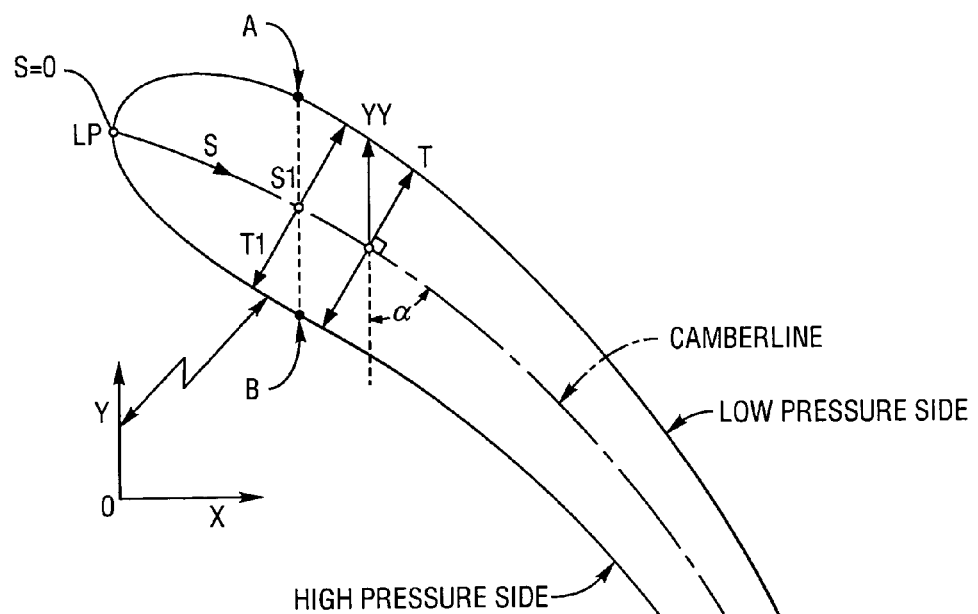
FIG. 3 is a cross-sectional view of a stator blade incorporating the features of the present invention.

In contrast to the blade geometry illustrated in FIGS. 2a and 2b, the blade geometry of the stator of the invention is shown in FIG. 3. FIG. 3 illustrates the cross-section for the blading that would correspond to the cross-section of FIG. 2a. The blade profile shown in FIG. 3 resembles an airfoil profile, which minimizes the combined effect of flow incidence losses and flow restriction losses. Flow restriction losses result from a reduction in the fluid flow area through the stator blading as previously explained. Flow incidence losses result from the wide range of angles for fluid flow vectors at the flow entrance section. As previously explained, a smooth and rounded profile for the leading edge section of the stator blades reduces the flow incidence losses and improves converter performance.

The parameters used in the design of the blade profile of FIG. 3 include an X-dimension, which is the axial coordinate for points along the low pressure side of the profile and along the high pressure side. The symbol Y represents a circumferential coordinate, which is in a direction opposite to the engine rotational direction. A local circumferential coordinate YY defines the location of any point on the blade surface along the camberline.

The camberline represents the center of the profile. It is obtained for an existing blade by averaging the high pressure side profile and the low pressure side profile along a tangential direction. The profiles of the high pressure side and the low pressure side of first and second segments thus are approximately symmetric with respect to curvilinear coordinates. Curvilinear coordinate S along the camberline is established and unitized using the total curvilinear camberline length from the leading point LP to the trailing point TP. As a result, the curvilinear coordinate ranges from S=0 at the leading point to S=1 at the trailing point. The leading point is a point along the profile most upstream, which corresponds to the profile point with the smallest X value. The trailing point is a point along the profile most downstream, where the X coordinate is largest.

The profile of FIG. 3 has three segments, which define the total blade profile. The first segment is the portion of the profile between location S=0 and point S1. The first segment of each of the blades defines in part a flow entrance region of the stator assembly. The second segment of the profile is the portion of the profile between point S1 and point S2 on the camberline. The second segment of each of the blades defines in part an intermediate flow region of the stator assembly. The third segment is the portion of the profile between point S2 on the camberline and the trailing point TP, where S=1. The third segment of each of the blades defines in part a flow exit region of the stator assembly.

Within the first segment (i.e., when 0<S<S1), the normal blade thickness T develops quickly to its maximum blade thickness T1. The profiles of the low pressure side and the high pressure side at the first segment are determined by using a semi-elliptic distribution of the circumferential blade thickness relative to the curvilinear coordinate S. The first segment profile is defined by the equations:

$$\left(\frac{S-S1}{S1}\right)^2 + \left(\frac{YY}{YY1}\right)^2 = 1 \text{ where:} \quad (1)$$

$$S1 = 0.15 - 0.25, \quad (2)$$

$$YY1 = \frac{0.5 T1}{\sin \alpha_1}, \quad (3)$$

$$T1 = 3-6 \text{ mm, and} \quad (4)$$

$$\alpha_1 = \text{the blade angle for the camberline at } S = S1. \quad (5)$$

The second segment, which is the major segment of the profile, has the limits S1<S2. The blade thickness reduces gradually from the point of maximum thickness to the minimum normal blade thickness at location S2 along the camberline. The profile of the main segment is determined by using a linear distribution of the circumferential blade thickness relative to the curvilinear coordinate S as defined by the following equations:

$$\frac{YY - YY1}{YY2 - YY1} = \frac{S - S1}{S2 - S1}, \text{ where:} \quad (6)$$

$$S2 = 0.85 - 0.95, \quad (7)$$

$$YY2 = 0.5\left(\frac{T2}{\sin \alpha_2}\right), \quad (8)$$

$$T2 = 1-2 \text{ mm, and} \quad (9)$$

$$\alpha_2 = \text{the blade angle for the camberline at } S = S2. \quad (10)$$

The third segment, which is the trailing segment of the profile of FIG. 3, is defined by S2<S<1.

The blade thickness diminishes quickly as the point S progresses from location S2 to the trailing point TP. The profile of the trailing segment is determined by using a semi-elliptic distribution of the circumferential blade thickness relative to the curvilinear coordinate S in accordance with the following equation:

$$\left(\frac{S-S2}{1-S2}\right)^2 + \left(\frac{YY}{YY2}\right)^2 = 1. \quad (11)$$

For all of the three segments, the high pressure side profile and the low pressure side profile are symmetric, one with respect to the other, using the camberline as the center. Thus, point A on the low pressure side has a profile that is symmetric to the profile at point B on the high pressure side, as seen in FIG. 3, except that the low pressure side profile has a positive curvature and the high pressure side profile has a negative curvature. This is expressed by the following relationship:

$$YY(\text{high pressure side}) = -1 * YY(\text{low pressure side}). \quad (12)$$

The camberline is determined by the entrance angle of a particle of fluid in the fluid flow path at the stator blade entrance and the blade exit angle at the fluid flow exit. The entrance angle is designed so that it generally corresponds to the incoming fluid flow angle at a speed ratio of approximately 0.8 near the coupling point. The blade exit angle, as will be explained subsequently, is determined by the K factor for the converter, which is an indication of torque capacity for the intended powertrain application.

The converter operates for the major portion of its operating time near a speed ratio of approximately between 0.6 and 0.98, including transmission gear ratio shifting. During startup, the stall torque ratio of the converter is developed for a very short time; i.e., 0.3 to 0.4 seconds. Before the engine speed increases to its commanded operating speed, the vehicle already will have started to move due to the initial engine torque generated at startup. The converter speed ratio is less than 0.2 at that time. When the engine responds to its commanded high speed during startup, the converter already is operating at its speed ratio of about 0.2. Thus, the converter operating range, for all practical purposes, is at a speed ratio greater than 0.2 and less than 0.98. It is in this region that the converter efficiency is enhanced by the stator blade profile of the invention.

Figure 4:
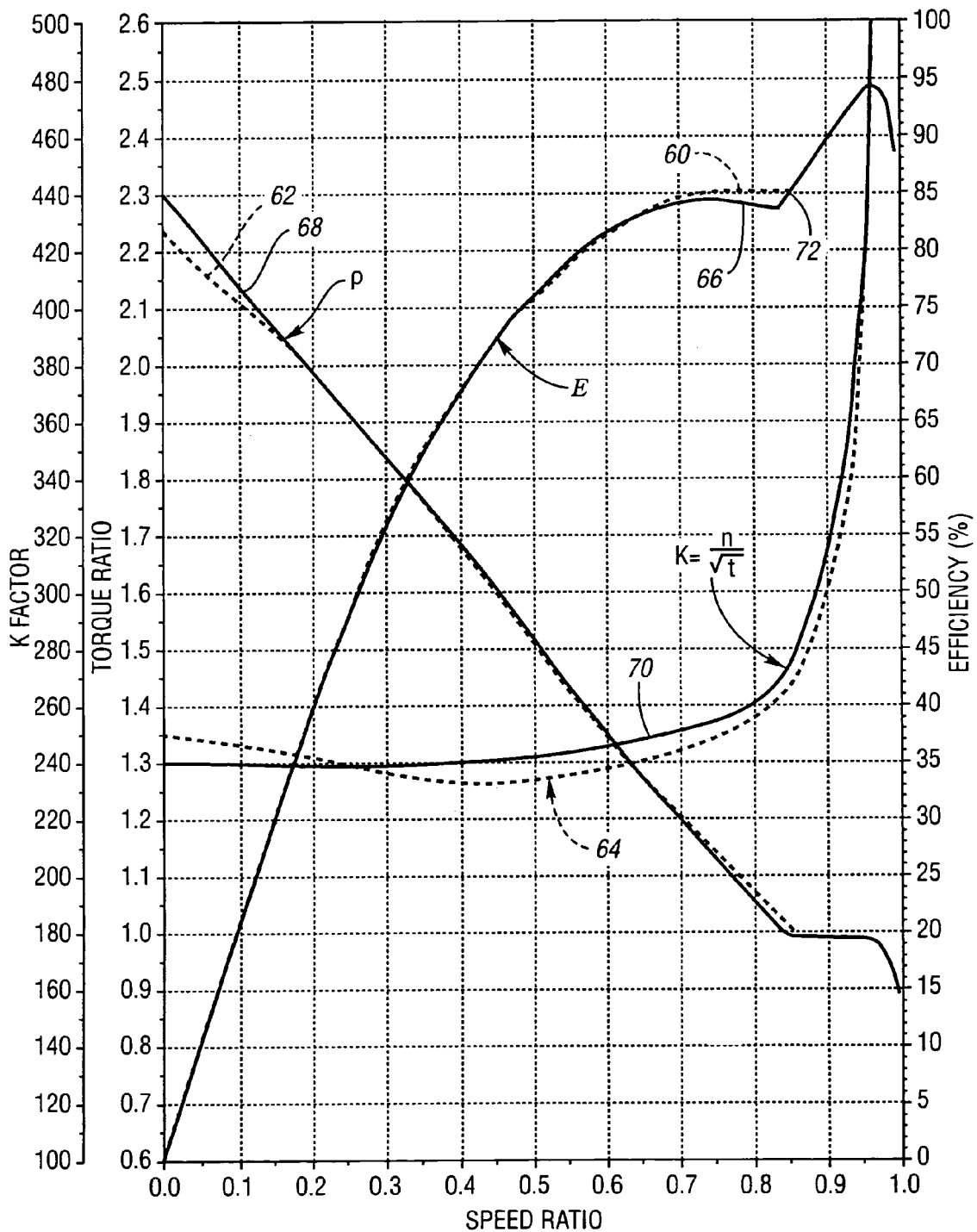
FIG. 4 is a performance plot of the characteristics of a three element torque converter embodying the improved stator design of the invention, together with a corresponding performance plot for a known three element hydrokinetic torque converter of similar size and torque capacity.

This enhancement in converter efficiency is demonstrated in FIG. 4, where efficiency $\epsilon$ is plotted at 60. The torque ratio p for the converter, with the stator blade profile of the invention, is plotted at 62. The K factor, sometimes referred to as size factor, is plotted at 64. The K factor is equal to impeller speed divided by the square root of impeller torque; i.e., $$K = \frac{n}{\sqrt{t}}.$$

Superimposed on the performance chart plotted in FIG. 4, for comparison purposes, is a performance chart for a conventional converter with dimensions and characteristics corresponding to the dimensions and characteristics of a converter using the stator blade profile of the invention. The conventional torque ratio plot is shown at 68, and the conventional K factor plot is shown at 70. The coupling point for the converter using the stator blade profile of the invention is shown at 72.

As seen in FIG. 4, there is a slight reduction in the torque ratio at stall when a stator having the blade profile of the invention is used. At high speed ratios near the value of 0.8, the efficiency is improved, as shown at 60. The percentage of the total operating time of the converter actually is near the speed ratio 0.8, as previously explained. Thus, the reduction in torque ratio at stall has only an insignificant overall adverse effect in comparison to the significant improvement in efficiency at the high speed ratio range.

The improvement in efficiency is demonstrated by actual vehicle performance data under highway and city driving conditions for a light truck with a torque converter transmission. A conventional converter in the transmission has been demonstrated in a road test to provide city fuel mileage of 22.25 miles per gallon. The improved stator profile of the invention results in an improved city fuel mileage per gallon of 22.48. Combined highway and city driving fuel consumption improves from 22.54 miles per gallon to 22.68 miles per gallon. This improvement is achieved without any reduction in the acceleration time from 0 to 60 miles per hour, which has been measured at 12.44 seconds.

FIG. 5 shows flow velocity vector diagrams for a particle fluid at the flow outlet entrance sections of the impeller, the turbine and the stator. In the case of the impeller, the tangential velocity of a point on the impeller blade is represented by the vector $u_O$. The absolute fluid flow velocity vector of a particle fluid at the impeller flow outlet is represented by the symbol $v_O$. The relative fluid flow velocity of a particle of fluid with respect to the impeller blade surface is represented by the symbol $w_O$. The torus flow velocity vector is represented by the symbol $f_O$ and the tangential component of the absolute velocity vector is represented by the symbol $s_O$.

In the case of the turbine, similar notations are used, although the symbols are represented in upper case rather than lower case. In the case of the stator, the symbols are the same as the symbols for the turbine, although prime notations are added to distinguish one symbol from the other.

FIG. 6 shows vector diagrams for the velocity of a particle of fluid at the entrance section of the impeller, the turbine and the stator. The relative fluid flow velocity vector $w_i$ for the impeller corresponds to the absolute fluid flow velocity vector $w_O$ for the impeller outlet. The impeller blading changes angle from the value $\gamma$ to the value $\beta_a$.

The velocity vectors at the turbine entrance are represented in FIG. 6 with similar notations, although they are represented in upper case rather than lower case as in the vector diagram for the impeller. Similarly, the velocity vectors for a particle of fluid at the stator entrance section are represented by notations corresponding to the notations in FIG. 6 for the turbine, although prime notations are added.

Figure 7:
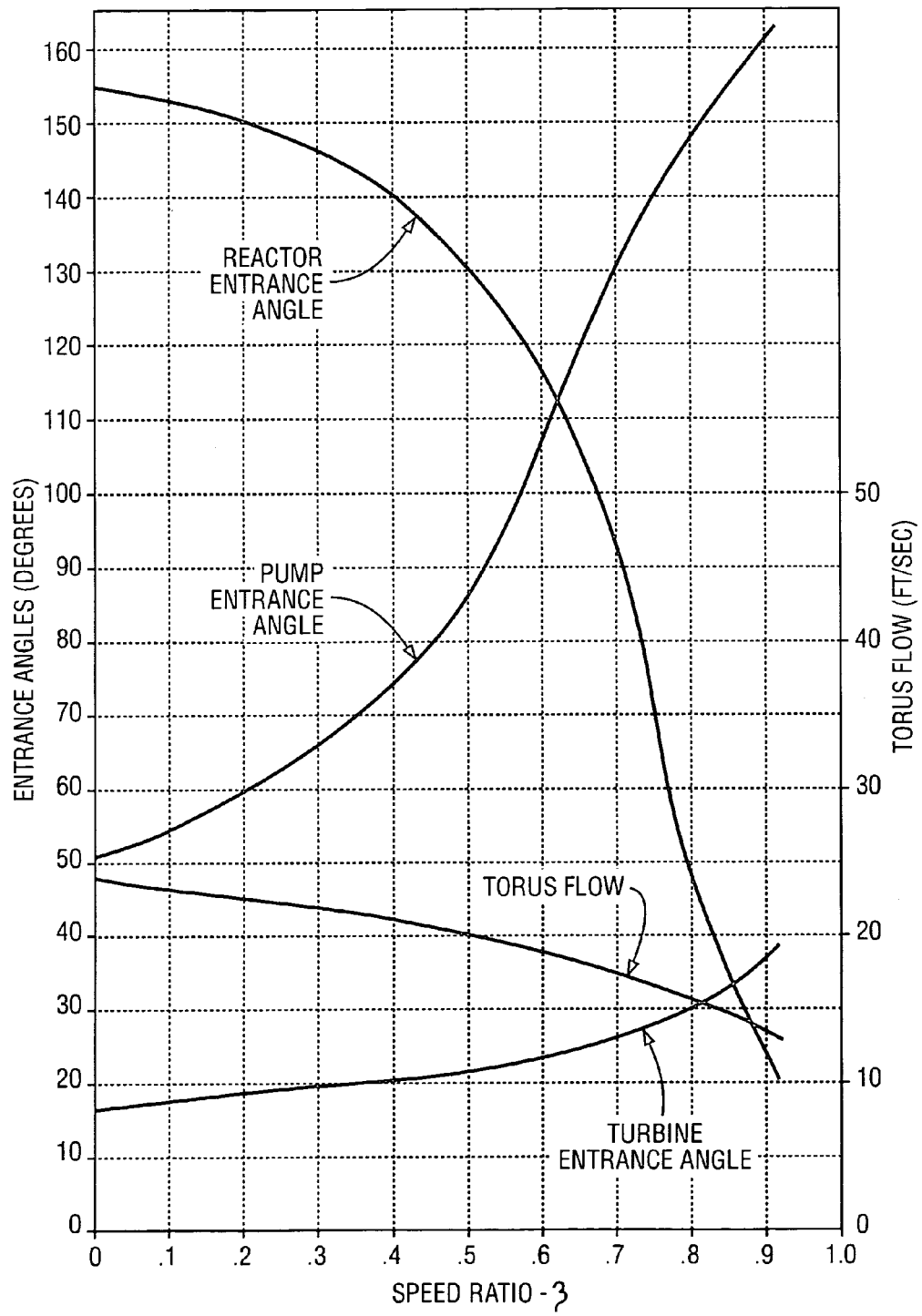
FIG. 7 is a plot of flow entrance angles based on the performance information illustrated in FIG. 4.

The entrance angles, as well as torus flow values, are plotted on FIG. 7 for speed ratios ranging from stall to the coupling point.

FIGS. 8a, 8b, and 8c illustrate the effect of changing speed ratio on the entrance angles for the impeller (pump), the turbine, and the stator (reactor). At stall, the flow velocity vector for a particle of fluid for the pump, the turbine and the reactor are shown at 74, 76, and 78, respectively. As the speed ratio changes from 0 at stall to the coupling point (e.g., 0.908), the direction of the fluid flow entrance vector changes as illustrated. The entrance flow velocity vector at the coupling point for the pump, the turbine, and the reactor are shown at 80, 82, and 84, respectively.

As previously explained, the entrance angle for the stator is determined by the flow entrance profile at the entrance section of the stator blading, which generally corresponds to the direction of the flow velocity vector at the coupling point.

The flow exit angles for the pump, the turbine, and the stator illustrated in FIGS. 8a, 8b, and 8c, respectively, can vary from the values shown in these figures. The pump exit angle of 65°, the turbine exit angle of 155°, and the stator exit angle of 23° are used in these figures merely for illustration.

Although an embodiment of the invention has been disclosed, it will be apparent for a person skilled in the art that modifications may be made without departing from the scope of the invention. All such modifications and equivalents thereof are intended to be covered by the following claims.

What is claimed:

1. A stator assembly for use in a hydrokinetic torque converter, comprising an impeller and a turbine, the stator assembly having a plurality of stator blades establishing a torus fluid flow path from a flow exit section of the turbine to a flow entrance section of the impeller;

each stator blade having a cross-sectional profile with a high pressure side and a low pressure side;

each blade profile of the plurality of stator blades having first, second, and third segments;

the first segment defining in part a flow entrance region of the stator assembly;

the second segment defining in part an intermediate flow region of the stator assembly; and the third segment defining in part a flow exit region of the stator assembly;

the stator blade having a camberline with a non-dimensional length of unity extending from a leading edge point to a trailing edge point;

a non-dimensional length of the first segment measured along the camberline from the leading edge point being approximately 0.15–0.25 and the starting point of the third segment measured along the camberline being a non-dimensional distance of approximately 0.85–0.95 from the leading edge point; and blade thickness measured on a line normal to the camberline being a maximum at an interface of the first and second segments and being a minimum at the trailing edge point;

the blade profile at the first segment having surfaces that are semi-elliptic, the surfaces being defined by a point distribution in which the points are determined by the functional relationship:

$$\left(\frac{S-S1}{S1}\right)^2 + \left(\frac{YY}{YY1}\right)^2 = 1$$

S being the curvilinear coordinate of a point on the camberline, S1 being the non-dimensional length of the first segment along the camberline and is approximately 0.15–0.25, YY being a circumferential coordinate of a point on the surface of the first segment measured in an XY reference plane relative to a point on the camberline, and $$YY1 = \frac{0.5T1}{\sin\alpha_1}$$

where:

T1 is the profile thickness at the point on the camberline in a direction normal to the camberline and is approximately 3 mm–6 mm, and $\alpha_1$ is the blade angle at a point on the camberline between the circumferential coordinate and a tangent to the point on the camberline.

2. A stator assembly for use in a hydrokinetic torque converter, comprising an impeller and a turbine, the stator assembly having a plurality of stator blades establishing a torus fluid flow path from a flow exit section of the turbine to a flow entrance section of the impeller;

each stator blade having a cross-sectional profile with a high pressure side and a low pressure side;

each blade profile of the plurality of stator blades having first, second, and third segments;

the first segment defining in part a flow entrance region of the stator assembly;

the second segment defining in part an intermediate flow region of the stator assembly; and the third segment defining in part a flow exit region of the stator assembly;

the stator blade having a camberline with a non-dimensional length of unity extending from a leading edge point to a trailing edge point;

a non-dimensional length of the first segment measured along the camberline from the leading edge point being approximately 0.15–0.25 and the starting point of the third segment measured along the camberline being a non-dimensional distance of approximately 0.85–0.95 from the leading edge point;

a blade thickness measured on a line normal to the camberline being a maximum at an interface of the first and second segments and being a minimum at the trailing edge point;

the blade profile at the second segment having surfaces that are defined by a point distribution in which the points are determined by the functional relationship:

$$\frac{YY - YY1}{YY2 - YY1} = \frac{S - S1}{S2 - S1};$$

S being the non-dimensional curvilinear coordinate, S1 being the non-dimensional first segment camberline length and is approximately 0.15–0.25, S2 is the first and second segment combined non-dimensional camberline length and is approximately equal to 0.85–0.95, and YY being a circumferential coordinate of a point on the surface measured on an XY reference plane relative to a point on the camberline, $$YY1 = \frac{0.5T1}{\sin\alpha_1};$$

and $$YY2 = 0.5\left(\frac{T2}{\sin\alpha_2}\right)$$

where:

T1 is approximately 3–6 mm, T2 is approximately 1–2 mm, and $\alpha_1$ and $\alpha_2$ are blade angles at S=S1 and S=S2, respectively, between the circumferential coordinate and a tangent to the point on the camberline.

3. A stator assembly for use in a hydrokinetic torque converter, comprising an impeller and a turbine, the stator assembly having a plurality of stator blades establishing a torus fluid flow path from a flow exit section of the turbine to a flow entrance section of the impeller;

the stator blades having a cross-sectional profile with a high pressure side and a low pressure side;

each blade profile of the plurality of stator blades having first, second, and third segments;

the first segment defining in part a flow entrance region of the stator assembly;

the second segment defining in part an intermediate flow region of the stator assembly;

the third segment defining in part a flow exit region of the stator assembly; the stator blade having a camberline with a non-dimensional length of unity extending from a leading edge point to a trailing edge point;

a non-dimensional length of the first segment measured along the camberline being approximately 0.15–0.25 and a starting point of the third segment measured along the camberline being a non-dimensional distance of approximately 0.85–0.95 from the leading edge point;

blade thickness measured on a line normal to the camberline being a maximum at an interface of the first and second segments and being a minimum at the trailing edge point;

the blade profile at the first segment having surfaces that are semi-elliptic, the surfaces being defined by a point distribution in which the points are determined by the functional relationship:

$$\left(\frac{S - S1}{S1}\right)^2 + \left(\frac{YY}{YY1}\right)^2 = 1 \text{ where:}$$

$$YY1 = \frac{0.5T1}{\sin\alpha_1};$$

S being the curvilinear coordinate of a point on the camberline, S1 being the non-dimensional length of the first segment along the camberline, YY being the circumferential coordinate of a point on the surface of the first segment measured in an XY reference plane relative to a point on the camberline, T1 being the blade profile thickness at S=S1 in a direction normal to the camberline and is approximately 3 mm–6 mm, and $\alpha_1$ being the blade angle at a point on the camberline between the circumferential coordinate and a tangent to the point on the camberline;

the blade profile at the second segment having surfaces that are defined by a point distribution in which the points are determined by the functional relationship:

$$\frac{YY - YY1}{YY2 - YY1} = \frac{S - S1}{S2 - S1},$$

S2 being the first and second segment combined non-dimensional camberline length and is approximately 0.85–0.95, and $$YY2 = 0.5\left(\frac{T2}{\sin\alpha_2}\right),$$

where: T2=the profile thickness at S=S2 in a direction normal to the camberline, and $\alpha_2$=blade angle at a point on the camberline between the tangential coordinate and a tangent to the point on the camberline.

4. The stator assembly set forth in claim 3 wherein the stator blade profile at the third segment has a semi-elliptic distribution of tangential blade thickness values with respect to curvilinear coordinates of points along the camberline.

5. The stator assembly set forth in claim 3 wherein the camberline is a locus of points defined by an average of coordinates of points on the high pressure side and on the low pressure side for each camberline point.

6. The stator assembly set forth in claim 3 wherein the first segment profile is characterized by an entrance blade angle that generally corresponds to a torus fluid flow angle at a stator flow entrance region at a coupling point for the hydrokinetic torque converter.

* * * * *